United States Patent
Rude

(10) Patent No.: US 7,480,367 B2
(45) Date of Patent: Jan. 20, 2009

(54) FAULT CHARACTERIZATION USING INFORMATION INDICATIVE OF ECHO

(75) Inventor: Michael J. Rude, Minnetonka, MN (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 1105 days.

(21) Appl. No.: 10/317,946

(22) Filed: Dec. 12, 2002

(65) Prior Publication Data

US 2004/0114729 A1    Jun. 17, 2004

(51) Int. Cl.
H04M 1/24    (2006.01)
H04M 3/08    (2006.01)
H04M 3/22    (2006.01)

(52) U.S. Cl. .................. 379/3; 379/14.01; 379/22.03

(58) Field of Classification Search ................ 379/1.01, 379/3, 4, 14.01, 15.05, 22.03, 22.04, 29.09, 379/406.01, 406.13; 324/500, 512, 531, 324/533; 375/232, 350; 370/286
See application file for complete search history.

(56) References Cited

U.S. PATENT DOCUMENTS

| | | | |
|---|---|---|---|
| 4,320,508 A * | 3/1982 | Takezoe | 714/4 |
| 4,547,633 A | 10/1985 | Szechenyi | |
| 4,859,951 A * | 8/1989 | Cole et al. | 324/534 |
| 5,289,539 A * | 2/1994 | Maruyama | 379/406.09 |
| 5,610,909 A | 3/1997 | Shaw | |
| 5,664,011 A | 9/1997 | Crochiere et al. | |
| 5,796,820 A | 8/1998 | Sasada | |
| 6,185,301 B1 | 2/2001 | Muraoka | |
| 6,337,907 B1 | 1/2002 | Laberteaux et al. | |
| 7,023,963 B1 * | 4/2006 | Chu et al. | 379/15.05 |
| 7,254,217 B2 * | 8/2007 | Rude et al. | 379/3 |
| 2003/0067881 A1 * | 4/2003 | Lunt et al. | 370/242 |
| 2004/0013178 A1 * | 1/2004 | Bui et al. | 375/219 |
| 2004/0013208 A1 | 1/2004 | Bui et al. | |
| 2004/0032921 A1 | 2/2004 | Bui | |
| 2004/0114752 A1 * | 6/2004 | Rude et al. | 379/406.01 |

FOREIGN PATENT DOCUMENTS

EP    0 268 391 A1    5/1988

* cited by examiner

*Primary Examiner*—Quoc D Tran
(74) *Attorney, Agent, or Firm*—Fogg & Powers LLC

(57) ABSTRACT

A fault associated with a communication medium is analyzed by correlating a first set of information indicative of echo associated with the communication medium with a second set of information indicative of echo. The fault is characterized based on the correlation between the first set of information and the second set of information. The first set of information and the second set of information can include echo canceller coefficients generated by an echo canceller coupled to the communication medium.

67 Claims, 5 Drawing Sheets

US 7,480,367 B2

FAULT CHARACTERIZATION USING INFORMATION INDICATIVE OF ECHO

TECHNICAL FIELD

The following description relates to telecommunications in general and to digital subscriber line (DSL) devices in particular.

BACKGROUND

Telecommunication service providers use a variety of techniques to troubleshoot faults occurring in systems that use a copper twisted-pair telephone line (also referred to here as a "local loop"). Typically, a fault such as an open circuit or a short circuit in a local loop is found using either a handheld testset or by a mechanized metallic loop test (MLT) system. These devices are normally able to measure the distance from the test device to the loop fault. In some situations, this approach can reduce the circuit restoral time as well as associated labor cost.

Although nearly all plain old telephone service (POTS) circuits are attached to such an MLT system, a large number of fielded high speed digital subscriber line (HDSL) circuits are not. These HDSL circuits include HDSL, HDSL2, and HDSL4 circuits, which are also collectively referred to here as "HDSLx" circuits. These HDSLx circuits typically carry critical DS1 data and have mean-time-to-restoral (MTTR) times that are typically subject to service level agreements. Returning these HDSLx circuits to service quickly after a fault is typically a high priority for service providers.

SUMMARY

In general, in one aspect, a method of analyzing a fault associated with an analyzed communication medium includes correlating a first set of information indicative of echo associated with the analyzed communication medium with a second set of information indicative of echo. The method also includes characterizing the fault based on the correlation between the first set of information and the second set of information.

In general, in another aspect, a telecommunication device includes an interface adapted to couple the telecommunication device to an analyzed communication medium. The telecommunication device is adapted to correlate a first set of information indicative of echo associated with the analyzed communication medium with a second set of information indicative of echo. The telecommunication device is also adapted to characterize an analyzed fault associated with the analyzed communication medium based on the correlation between the first set of information and the second set of information.

In general, in another aspect, a method of analyzing an analyzed fault associated with an analyzed telephone line includes receiving an echo canceller profile. The echo canceller profile includes at least one set of profile echo canceller coefficients. The method further includes correlating a set of first echo canceller coefficients from an echo canceller with at least one of the sets of profile echo canceller coefficients included in the echo canceller profile and determining if there is a first correlation between the set of first echo canceller coefficients and at least one of the sets of profile echo coefficients included in the echo canceller profile. The method also includes, when there is the first correlation between the set of first echo canceller coefficients and at least one of the sets of profile echo coefficients included in the echo canceller profile, determining that the analyzed fault has an attribute associated with the at least one set of profile echo coefficients included in the echo canceller profile with which the set of first echo canceller coefficients has the first correlation.

In general, in another aspect, a line interface unit includes a first interface adapted to couple the line interface unit to a first communication link and a second interface, coupled to the first interface, adapted to couple the line interface unit to a second communication link. The line interface unit further includes an echo canceller coupled to the first communication link and a controller coupled to the echo canceller. The controller is adapted to correlate a set of first echo canceller coefficients with a second set of echo canceller coefficients to create a correlation between the first set and the second set. The controller is further adapted to characterize an analyzed fault associated with the first communication link based on the correlation between the first set and the second set.

The details of one or more embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
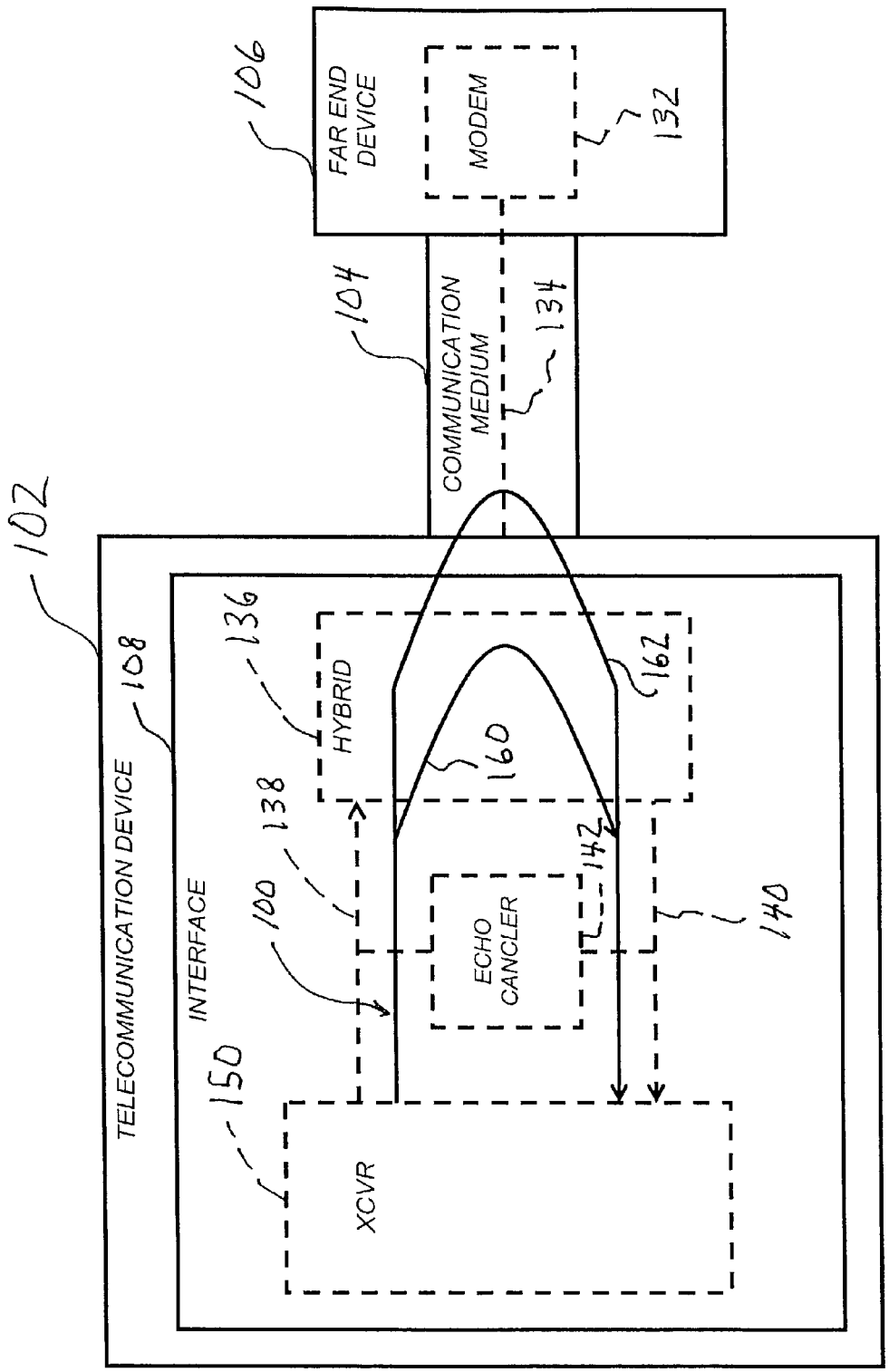
FIG. 1 is a block diagram illustrating echo in a telecommunication device coupled to a communication medium.

FIG. 1 is a block diagram illustrating echo 100 in a telecommunication device 102 coupled to a communication medium 104. Device 102 is coupled to a far-end device 106 via the communication medium 104. Device 102 includes an interface 108 that couples the rest of the components of the device 102 to the communication medium 104. Typically, there is echo 100 that occurs in the device 102. Echo 100 is caused by impedance mismatches between the device 102 and the communication medium 104. A fault, such as an open circuit or a short circuit, occurring in the communication medium 104 between the device 102 and the far-end device 106 can cause impedance mismatches and, as a result, echo.

For example, in one embodiment illustrated with dashed lines in FIG. 1, device 102 is a line interface unit. In such an embodiment, the far-end device 106 includes a modem 132, and the communication medium 104 includes a twisted-pair telephone line 134. The line interface unit is coupled to the modem 132 via the twisted-pair telephone line 134.

The interface 108 includes a hybrid circuit 136. Hybrid circuit 136 converts the two-line twisted-pair telephone line 134 into a 4-line connection that is coupled to a transceiver 150. This 4-line connection includes a separate 2-line transmit path 138 and a receive path 140.

Hybrid circuit 136 is designed to isolate signals on the transmit path 138 from signals on the receive path 140. Theoretically, hybrid circuit 136 can achieve perfect isolation under matched impedance conditions. In practice, however, perfect impedance matching is unlikely and a portion of the signal transmitted on the transmit path 138 reflects back along the receive path 140. This reflection is included in echo 100 and is referred to here as hybrid echo 160. In such an embodiment, other reflections (referred to here as line echo 162) included in echo 100 may also result from normal loop conditions such as bridge taps, wire gauge changes, and the like. The line echo 162 may also result from faults occurring in the twisted-pair telephone line 134.

Echo may be acceptable and even desirable in POTS service since echo allows a speaker to hear his or her own attenuated voice through the ear piece. However, in some situations, echo limits data transmission in HDSLx service, since echo can create a high "noise floor," which can limit the signal-to-noise ratio (SNR). In HDSLx applications, an echo canceller 142 is typically used to cancel at least a portion of the echo 100. In one embodiment, echo canceller 142 is implemented using an adaptive filter that estimates the amount of echo 100 by constantly updating a set of echo coefficients. The estimate of the echo 100 is subtracted from the received signal from the receive path 140. In such an implementation, the echo canceller 142 is typically implemented in an application-specific integrated circuit (ASIC).

Figure 2:
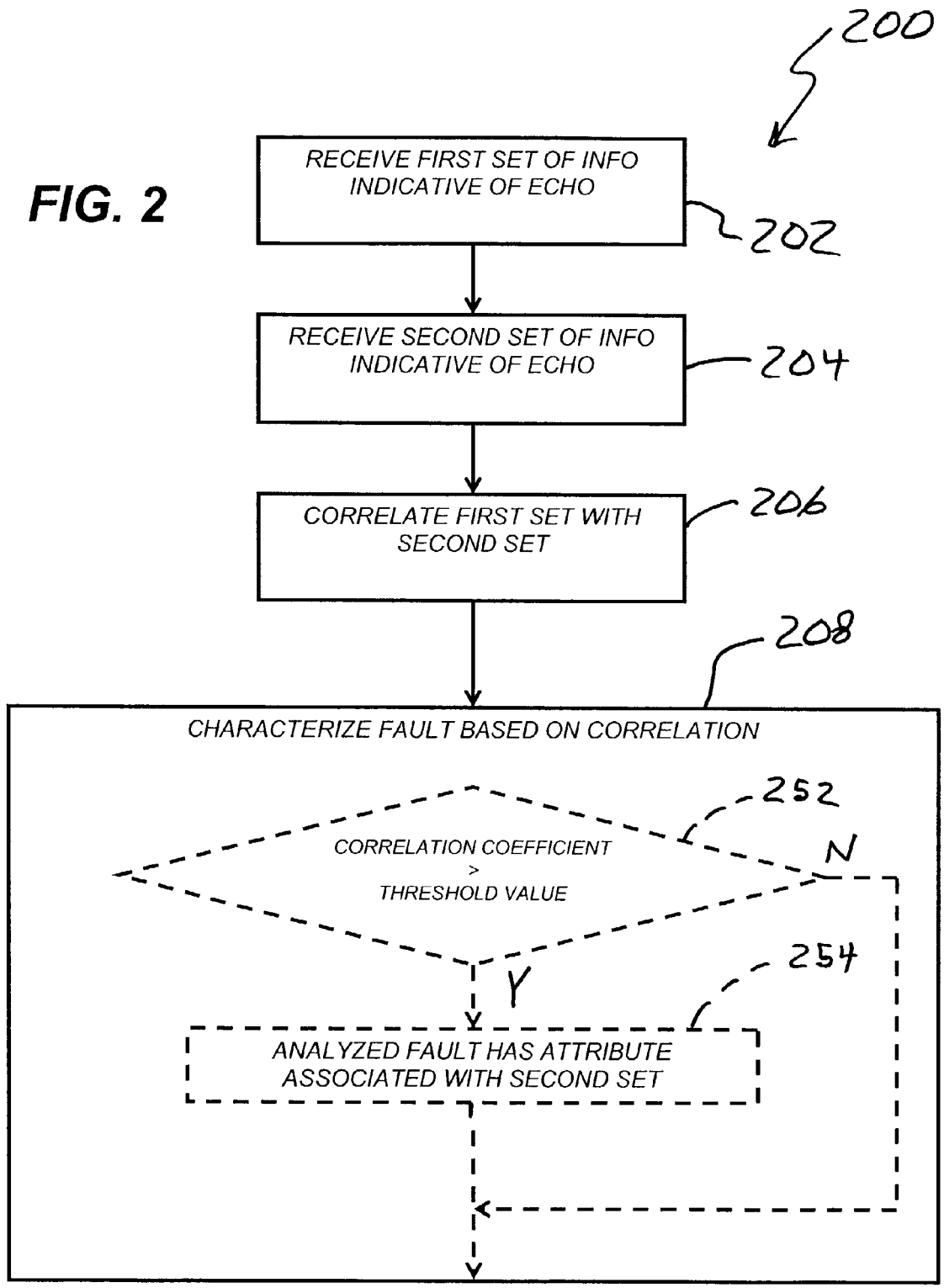
FIG. 2 is a flow diagram of one embodiment of a method of analyzing a fault associated with a communication medium.

FIG. 2 is a flow diagram of one embodiment of a method 200 of analyzing a fault associated with a communication medium. The fault to be analyzed is referred to here as the "analyzed fault." The communication medium that is analyzed is referred to here as the "analyzed communication medium." The analyzed fault can be, for example, a short circuit or an open circuit. Moreover, it is to be understood that analysis may determine that there is no fault in the analyzed communication medium. For example, this may be because there is no fault at all or that any fault with embodiments of method 200 is located somewhere other than in the analyzed communication medium. In one embodiment, the analyzed communication medium is a twisted-pair telephone line coupled to an HDSLx line card. In such an embodiment, a far-end device such as an HDSLx modem or a remote terminal need not be coupled to the other end of the telephone line in order to analyze the analyzed fault. Embodiments of method 200 are suitable, for example, for use with a telecommunication device that employs an echo canceller and communicates over one or more twisted-pair telephone lines.

Method 200, shown in FIG. 2, includes receiving a first set of information indicative of echo associated with the analyzed communication medium (block 202). In one embodiment, the first set of information is a set of echo canceller coefficients from an echo canceller coupled to the analyzed communication medium. For example, in such an embodiment, the set of echo canceller coefficients includes echo canceller coefficients currently used by the echo canceller. The set of echo canceller coefficients are received, in such an embodiment, from the echo canceller by a controller. In other embodiments, the first set of information (for example, a set of echo canceller coefficients) is retrieved from a memory such as a RAM or ROM, or is otherwise generated or calculated.

Method 200 also includes receiving a second set of information indicative of echo (block 204). In one embodiment, the second set of information is a set of echo canceller coefficients corresponding to a known fault in the analyzed communication medium or a communication medium similar to the analyzed communication medium. For example, in one implementation of such an embodiment, prior to normal operation, an echo canceller coupled to a communication medium similar to the analyzed communication medium is operated with the known fault in the communication medium. Then, a set of echo canceller coefficients resulting from operating the echo canceller with the known fault is saved and stored in a memory such as ROM or RAM for later retrieval. In such an embodiment, a controller or other device retrieves the set of saved echo canceller coefficients from the memory. In other embodiments, the second set of information (for example, a set of echo canceller coefficients) is otherwise generated or calculated.

Method 200 also includes correlating the first set of information with the second set of information (block 206). For example, in one embodiment, a first set of echo canceller coefficients are correlated with a second set of echo canceller coefficients. In one implementation of such an embodiment, a normalized covariance correlation is performed in order to obtain a correlation coefficient between the first set of echo canceller coefficients and the second set of echo canceller coefficients. Other ways of correlating the first and second sets of echo canceller coefficients can be used, for example, using higher order statistics and/or neural networks.

Then, the analyzed fault is characterized based on the correlation between the first set of information and the second set of information (block 208). For example, in one embodiment (shown in FIG. 2 with dashed lines), a first and second set of echo canceller coefficients are correlated and a resulting correlation coefficient is compared to a threshold coefficient value (block 252). If the correlation coefficient is greater than (or greater than or equal to) the threshold coefficient value, a determination is made that the analyzed fault has an attribute associated with the second set of echo canceller coefficients (block 254). In implementations where a known fault is associated with the second set of echo canceller coefficients, a determination is made that the analyzed fault has an attribute of the known fault associated with the second set of echo canceller coefficients. For example, in one case, a determination is made that the analyzed fault is of the same type (for example, an open circuit or short circuit) as the known fault associated with the second set of echo canceller coefficients.

In implementations of such an embodiment, if the correlation coefficient is less than (or less than or equal to) the threshold coefficients value, a determination is made that there is not a fault in the communication having an attribute associated with the second set of echo canceller coefficients. In other implementations, no determination is made if the correlation coefficient is less than the threshold coefficients value.

In another embodiment, a known fault having a known location within (or otherwise in relation to) the analyzed medium (or a medium similar to the analyzed medium) is associated with the second set of echo canceller coefficients. In such an embodiment, if a correlation coefficient between a first set of echo canceller coefficients and the second set of echo canceller coefficients is greater than (or greater than or equal to) a threshold coefficient value, a determination is made that the analyzed fault is of the same type as the known fault and is at the same location within the analyzed medium as the known fault. The second set of echo canceller coefficients, in one implementation of such an embodiment, includes several groups of echo canceller coefficients associated with multiple known faults located at various locations within the analyzed medium (or a medium similar to the analyzed medium). Each group of echo canceller coefficients is associated with one of the multiple known faults, each of which is located at one of the multiple locations within the analyzed medium (or a medium similar to the analyzed medium). When an analyzed fault is characterized, the first set of echo canceller coefficients is correlated with one or more of the groups of echo canceller coefficients included in the second set of echo canceller coefficients. If a correlation coefficient resulting from correlating the first set of echo canceller coefficients with a particular group is greater than a threshold correlation value, then a determination is made that the analyzed fault is at the location associated with the particular group.

In one implementation of such an embodiment, this location data is used (for example, by a service provider) to identify whether the analyzed fault is within a central office or outside of the central office in the outside plant. In such an implementation, locations that are within the central office and locations that are outside of the central office in the outside plant are identified. If, as result of performing an embodiment of method 200, an analyzed fault is identified as having a location that is associated with the central office, a determination is made that the analyzed fault is within the central office. If an analyzed fault is identified as having a location that is associated with the outside plant, a determination is made that the analyzed fault is in the outside plant.

Whether the analyzed fault is within the central office or outside of the central office in the outside plant can provide a useful data point for service providers. A service provider can use this data point to assist in the dispatch of repair technicians. In some situations, this has value because central office technicians and outside plant technicians have different skill levels, work rules, and the like. For example, if a loop fault is identified as being in the central office, then an expensive outside plant service dispatch can be avoided. Alternatively, if a loop fault is identified as being in the outside plant, then an outside plant technician can be immediately dispatched to minimize MTTR.

In other embodiments, the analyzed fault is characterized in other ways. Although method 200 is depicted in FIG. 2 with the elements of method 200 occurring in a particular order, it is to be understood that the elements of method 200 can occur in a different order or certain elements can occur in parallel.

Method 200 allows a fault associated with a communication medium to be analyzed using information indicative of echo associated with the communication medium. In those embodiments where such information is used for other purposes (such as echo cancellation), resources and costs associated with providing such a fault analysis capability can be reduced by using existing functionality to obtain such information.

Moreover, embodiments of method 200 that make use of an echo canceller can be operated in a single-ended manner that does not require a far-end device to be coupled to the communication medium in order for the fault to be characterized. Such embodiments can allow a service provider (such as a provider of HDSLx service) to characterize a fault without having to access equipment located at a customer's premise. This can reduce costs and delays associated with sending a technician to a customer's premise in order to access such equipment.

Figure 3:
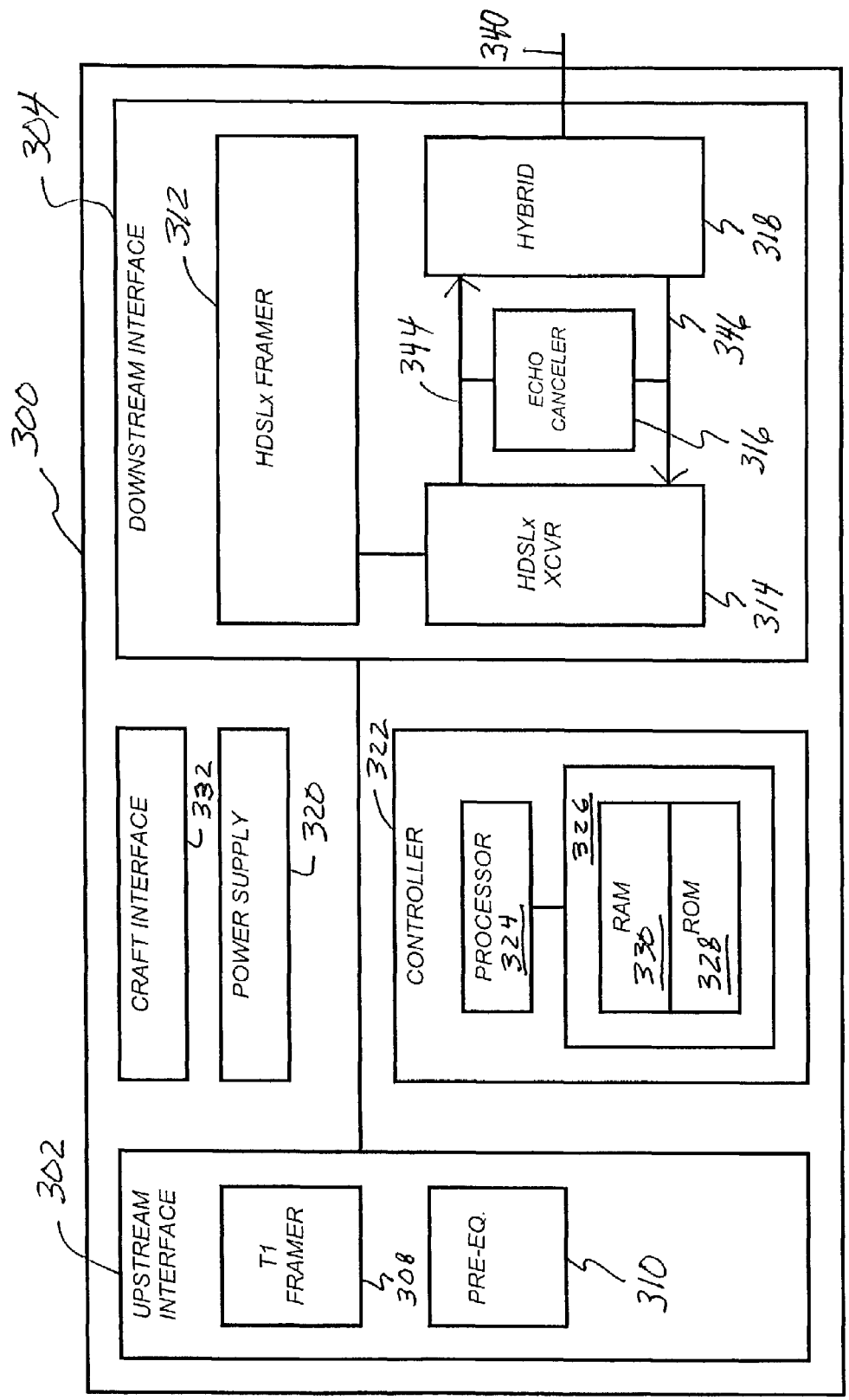
FIG. 3 is a block diagram of one embodiment of an HDSL2 line interface unit.

FIG. 3 is a block diagram of one embodiment of an HDSLx line interface unit 300 (also referred to here as a "line card" 300). In one embodiment, the line card 300 is used to implement the methods and apparatus described here. Line card 300 is used to send and receive DS1 traffic over an HDSLx communication link using at least one twisted-pair telephone line 340 (also referred to here as a "local loop" or "loop"). For example, in one embodiment, the line card 300 is an HDSL2 line interface unit that is used to send and receive DS1 traffic over an HDSL2 link using a single twisted-pair telephone line.

The line card 300 includes an upstream interface 302 and a downstream interface 304. Upstream interface 302 and downstream interface 304 couple the line card 300 to an upstream link and a downstream link, respectively. In the embodiment shown in FIG. 3, the upstream link is a DSX-1 link that is cross-connected to a time division-multiplexing network. The upstream interface 302 couples the line card 300 to the DSX-1 link and includes, for example, a T1 framer 308 and a DSX-1 pre-equalizer 310. In the embodiment shown in FIG. 3, the downstream link is an HDSLx link such as an HDSL, HDSL2, or HDSL4 link. The downstream interface 304 couples the line card 300 to the HDSLx link. The HDSLx link is implemented using the twisted-pair telephone line 340. The downstream interface 304 includes, for example, an HDSLx framer 312, an HDSLx transceiver 314, an echo canceller 316, and a hybrid circuit 318.

The line card 300 includes a power supply 320 for providing power to the various components of the line card 300. The line card 300 also includes a controller 322. For example, in the embodiment shown in FIG. 3, the controller 322 includes a programmable processor 324 (such as a microprocessor) and a memory 326. Memory 326 includes both read-only memory ("ROM") 328 and random access memory ("PAM") 330. Although memory 326 is shown in FIG. 3 as having a separate ROM 328 and RAM 330, other memory configurations can be used, for example, using scratchpad memory included in the programmable processor 324.

Line card 300 also includes a craft interface 332. Craft interface 332 includes, for example, a universal asynchronous receiver-transmitter ("UART") that couples an RS-232 serial port to the controller 322. A user can connect a portable computer or other data terminal to the serial port and communicate with an embedded control program executing on the programmable processor 324. Alternatively, the user can communicate with the embedded control program over an embedded operations channel carried among the DS1 traffic handled by the line card 300.

The hybrid circuit 318 converts a 2-wire, full-duplex twisted-pair telephone line 340 into a separate 2-wire transmit path 344 and a separate 2-wire receive path 346. Echo canceller 316 is used to cancel at least a portion of any echo. In one embodiment, echo canceller 316 is implemented using an adaptive filter that estimates the amount of echo by constantly updating a set of echo coefficients. The estimate of the echo is subtracted from the received signal from the receive path 346. In such an embodiment, the echo canceller 316 is implemented in an ASIC.

In operation, the line card 300 receives DS1 traffic from the downstream link on the downstream interface 304. The incoming DS1 traffic is formatted as HDSL frames. The downstream interface 304 processes the incoming frames and communicates the DS1 traffic to the upstream interface 302. The upstream interface 302 formats the DS1 traffic into T1 frames and transmits the frames out on the upstream link. A similar process occurs in reverse for DS1 traffic received on the upstream interface 302 from the upstream link. The incoming DS1 traffic is formatted as T1 frames. The upstream interface 302 processes the incoming frames and communicates the DS1 traffic to the downstream interface 304. The downstream interface 304 formats the DS1 traffic into HDSL frames and transmits the frames out on the downstream link. Although FIG. 3 depicts an HDSLx line interface unit, other telecommunications devices can be used to implement the techniques described here. For example, G.SHDSL or asynchronous digital subscriber line (ADSL) devices can be used.

Embodiments of method 200 can be implemented using line card 300. In one such embodiment, the analyzed communication medium is the telephone line 340 (referred to here as the "analyzed line"), which is coupled to the line card 300. In this embodiment, an HDSL2 modem or other remote device need not be coupled to the other end of the analyzed line in order to analyze an analyzed fault.

In this embodiment, the second set of information indicative of echo includes an echo canceller profile. The echo canceller profile includes at least one set of echo canceller coefficients (referred to here as the "profile echo canceller coefficients"). In one implementation of this embodiment, the profile echo canceller coefficients are generated by operating the same line card 300 used to analyze the analyzed fault while the line card 300 is coupled to the analyzed line. In other implementations, the profile echo canceller coefficients are generated using other techniques. For example, in one such other implementation, the profile echo canceller coefficients are generated by operating the same line card 300 used to analyze the analyzed fault while the line card 300 is coupled to a telephone line other than the analyzed line. In other implementations, the profile echo canceller coefficients are generated by operating a line card other than the line card 300 used to analyze the analyzed fault. For example, in one such implementation, a line card of the same type as the line card 300 used to analyze the analyze fault is used.

In one implementation of this embodiment, the set of profile echo canceller coefficients is generated as a part of the manufacturing process. The echo canceller of a line card (for example, the line card 300 used to analyze the analyzed fault or a line card similar thereto) is operated with one or more known fault conditions in the telephone line to which the line interface is coupled (for example, the analyzed line or another telephone line). The echo canceller coefficients for the known fault conditions are saved and included in the echo canceller profile. During operation, the saved echo canceller profile is retrieved and used. In other embodiments, a similar procedure is used to generate the echo canceller profile during installation of the line card 300.

In other implementations of this embodiment, the echo canceller profile is created in other ways. For example, the echo canceller profile is created by calculating a set of profile echo canceller coefficients in one such other implementation. In implementations of this embodiment, the echo canceller profile is periodically updated (for example, by recalculating a set of profile echo canceller coefficients) and saved during operation of the line card 300. The echo canceller profile is updated, for example, to reflect changes in analyzed line or other operating conditions.

In this embodiment, the first set of information indicative of echo associated with the analyzed line includes a set of echo canceller coefficients generated by the echo canceller 316 of the line card 300. The set of echo canceller coefficients generated by the echo canceller 316 in this embodiment is referred to here as the "set of first echo canceller coefficients." In one implementation, the set of first echo canceller coefficients includes echo canceller coefficients generated by the echo canceller 316 during operation of the line card 300 in a fault test mode. The set of first echo canceller coefficients is received, in such an implementation, by the programmable processor 324 from the echo canceller 316. In other implementations, the set of first echo canceller coefficients includes echo canceller coefficients generated by the echo canceller 316 during the normal operating mode of the line card 300.

Figure 4:
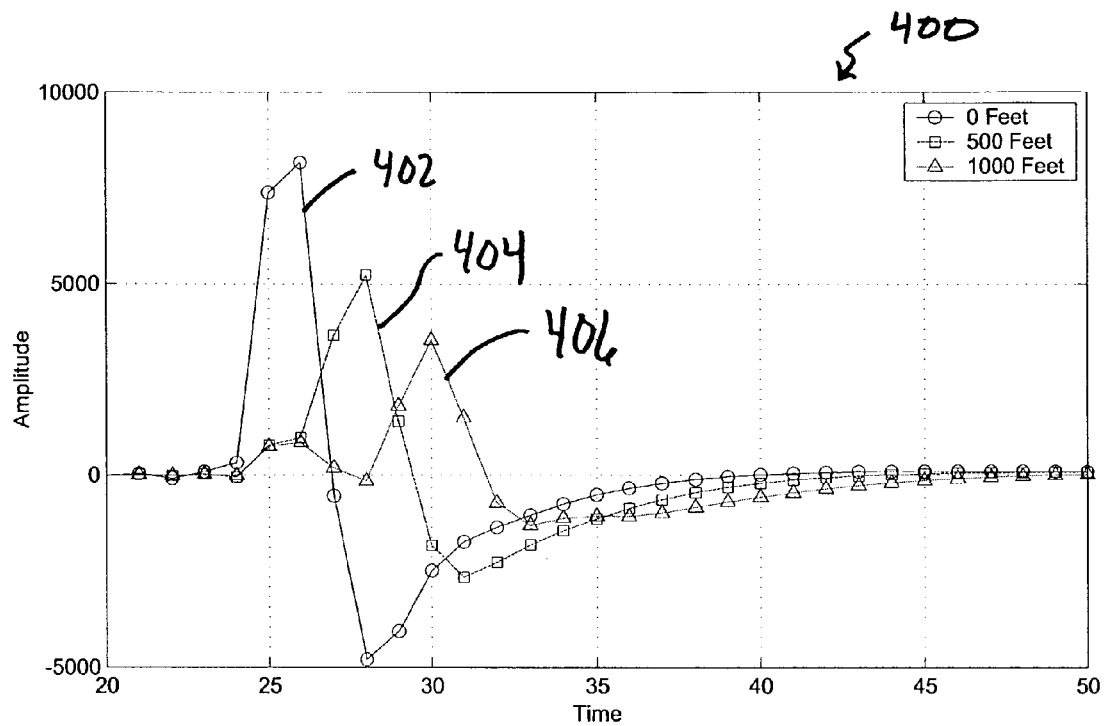
FIG. 4 is a chart showing exemplary echo responses of a hybrid circuit from one implementation of an HDSL2 line interface unit under various open-circuit faults.
Figure 5:
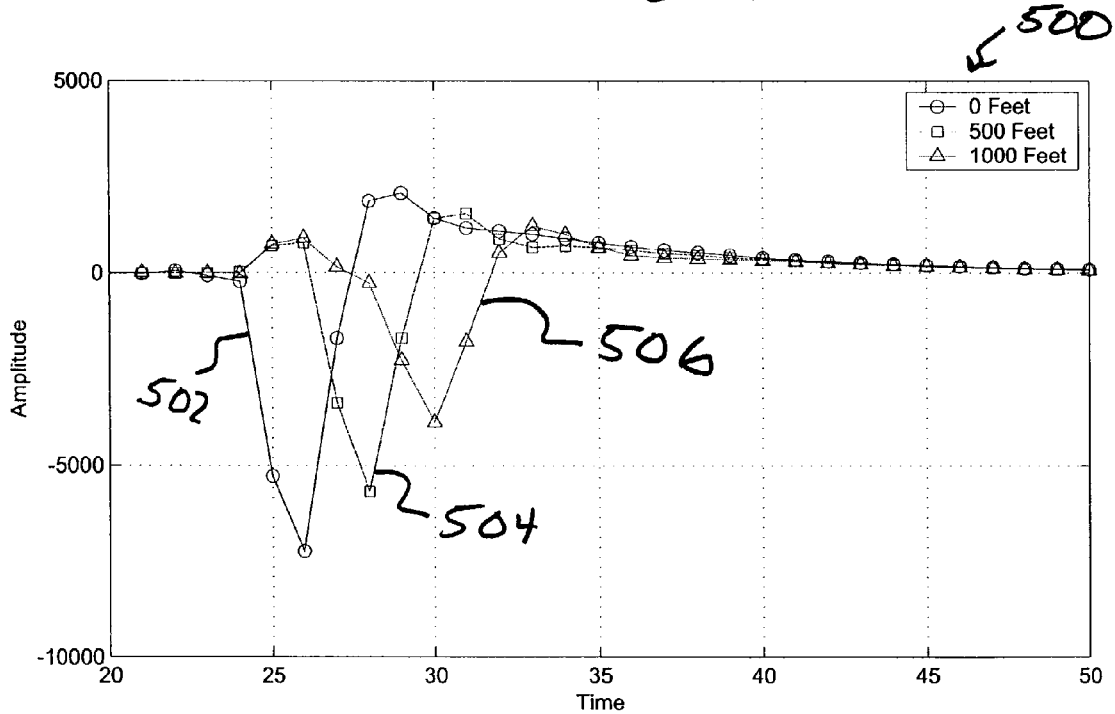
FIG. 5 is a chart showing exemplary echo responses of a hybrid circuit from one implementation of an HDSL2 line interface unit under various short-circuit faults.

FIGS. 4 and 5 illustrate the creation of one example of an echo canceller profile. FIG. 4 is a chart 400 showing exemplary echo responses of a hybrid circuit 318 from one implementation of an HDSL2 line interface unit 300 coupled to a telephone line 340 with open-circuit faults located at various distances from the hybrid circuit 318. Lines 402, 404, and 406 are echo responses of the hybrid circuit 318 when the telephone line 340 to which the HDSL2 line interface unit 300 is connected has an open-circuit fault located 0 feet, 500 feet, and 1000 feet, respectively, from the hybrid circuit 318. FIG. 5 is a chart 500 showing exemplary echo responses of a hybrid circuit 318 from one implementation of an HDSL2 line interface unit 300 coupled to a telephone line 340 with short-circuit faults located at various distances from the hybrid circuit 318. Lines 502, 504, and 506 are echo responses of the hybrid circuit 318 when the telephone line 340 to which the HDSL2 line interface unit 300 is connected has a short-circuit fault located 0 feet, 500 feet, and 1000 feet, respectively, from the hybrid circuit 318. Echo coefficients corresponding to each of the echo responses shown in FIGS. 4 and 5 are determined by the echo canceller 316 included in the HDSL2 line interface unit 300. The resulting echo coefficients are included in the echo canceller profile In this embodiment, the first set of information indicative of echo associated with the analyzed line and the second set of information indicative of echo associated with the analyzed line are correlated by correlating the set of first echo canceller coefficients with at least one of the sets of profile echo canceller coefficients included in the echo canceller profile. For example, in one embodiment, a normalized covariance correlation is performed. For each normalized covariance correlation that is performed, a correlation coefficient is generated. Other ways of correlating the set of first echo canceller coefficients with at least one of the sets of profile echo canceller coefficients included in the echo canceller profile can be used. In one implementation, the programmable processor 324 of the controller 322 is programmed to perform the correlation. In other implementations, a computer or other device is coupled to the line card 300 (for example, via the craft interface 332 or via an embedded operations channel). The computer or other device then performs the correlation.

Then, the analyzed fault is characterized based on the correlation between the set of first echo canceller coefficients and at least one of the sets of profile echo canceller coefficients included in the echo canceller profile. For example, in one implementation, it is determined if there is a high correlation between the set of first echo canceller coefficients and at least one of the sets of profile echo canceller coefficients included in the echo canceller profile. If there is, a determination is made that the analyzed fault has an attribute associated with the set of profile echo canceller coefficients with which the set of first echo canceller coefficients is highly correlated. Moreover, if there is not a high correlation between the set of first echo canceller coefficients and at least one of the sets of echo canceller coefficients included in the echo canceller profile, a determination is made that the analyzed fault does not have an attribute associated with the sets of profile echo canceller coefficients included in the echo canceller profile. It is to be understood, however, that in other implementations, if there is not a high correlation between the set of first echo canceller coefficients and at least one of the sets of profile echo canceller coefficients included in the echo canceller profile, no determination is made and additional techniques are used to analyze the analyzed fault, if desired.

Figure 6:
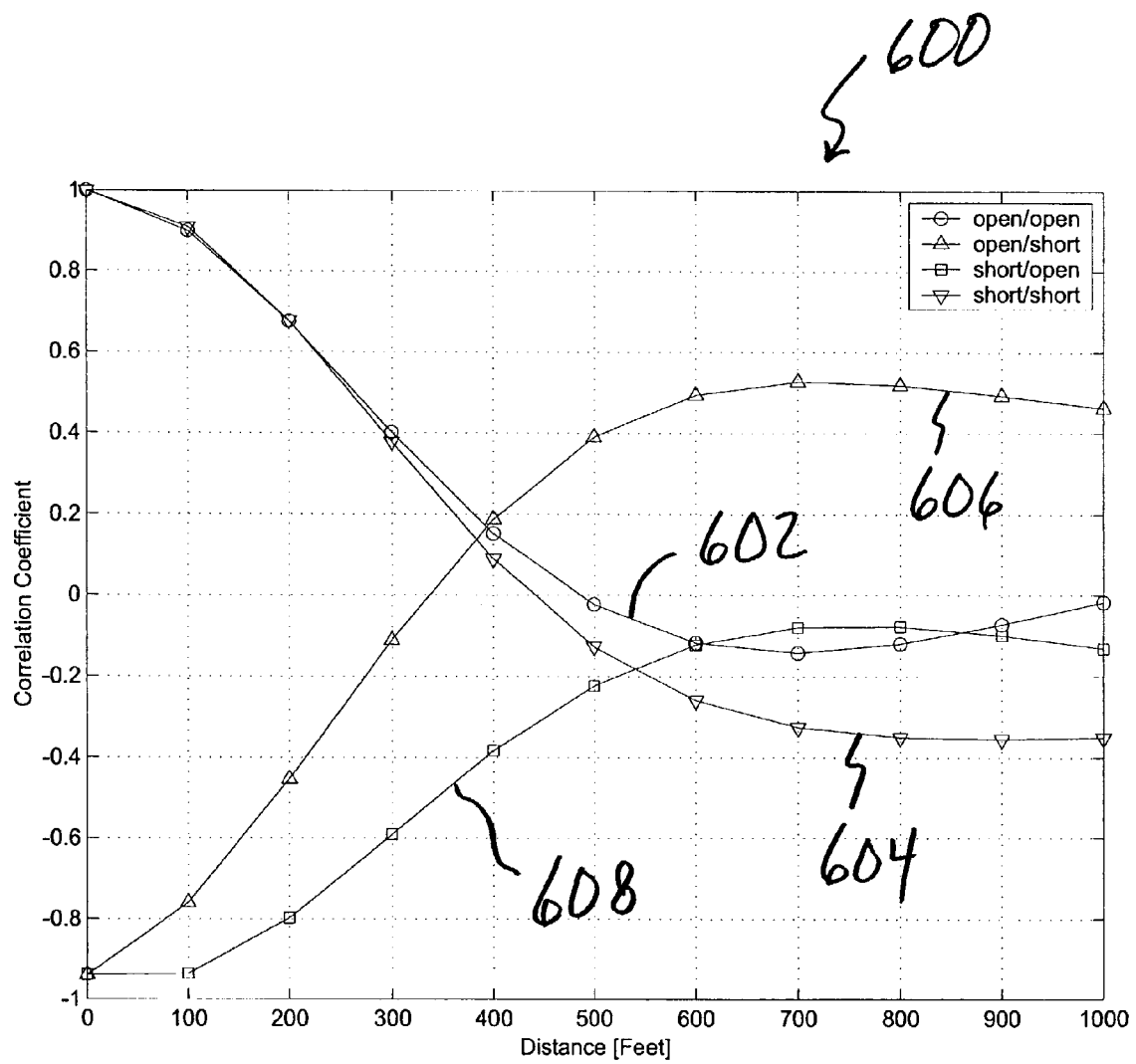
FIG. 6 is a chart showing exemplary correlation coefficients between echo responses generated by an echo canceller from one embodiment of an HDSL2 line card with various echo canceller coefficients associated with faults located at various distances from a hybrid circuit.

The determination as to whether there is a high correlation between the set of first echo canceller coefficients and at least one of the sets of profile echo canceller coefficients included in the echo canceller profile, in one implementation, is made by comparing a correlation coefficient to a threshold correlation value. FIG. 6 is a chart showing exemplary correlation coefficients between echo responses generated by an echo canceller 316 from one embodiment of an HDSL2 line card 300 with various echo canceller coefficients associated with faults located at various distances from a hybrid circuit 318. Line 602 shows the correlation coefficients resulting from correlating a 0 feet, open-circuit echo response (line 402 in FIG. 4) with the 0 feet (line 402 in FIG. 4), 100 feet (not shown in FIG. 4), 200 feet (not shown in FIG. 4), 300 feet (not shown in FIG. 4), 400 feet (not shown in FIG. 4), 500 feet (line 404 in FIG. 4), 600 feet (not shown in FIG. 4), 700 feet (not shown in FIG. 4), 800 feet (not shown in FIG. 4), 900 feet (not shown in FIG. 4), and 1000 feet (line 406 in FIG. 4) open-circuit echo responses. Line 604 shows the correlation coefficients resulting from correlating the 0 feet, short-circuit echo response (line 502 in FIG. 5) and the 0 feet (line 502 in FIG. 5), 100 feet (not shown in FIG. 5), 200 feet (not shown in FIG. 5), 300 feet (not shown in FIG. 5), 400 feet (not shown in FIG. 5), 500 feet (line 504 in FIG. 5), 600 feet (not shown in FIG. 5), 700 feet (not shown in FIG. 5), 800 feet (not shown in FIG. 5), 900 feet (not shown in FIG. 5), and 1000 feet (line 506 in FIG. 5) short-circuit echo responses. Line 606 shows the cross-correlation coefficients resulting from correlating the 0 feet, open-circuit echo response (line 402 in FIG. 4) and the 0 feet (line 502 in FIG. 5), 100 feet (not shown in FIG. 5), 200 feet (not shown in FIG. 5), 300 feet (not shown in FIG. 5), 400 feet (not shown in FIG. 5), 500 feet (line 504 in FIG. 5), 600 feet (not shown in FIG. 5), 700 feet (not shown in FIG. 5), 800 feet (not shown in FIG. 5), 900 feet (not shown in FIG. 5), and 1000 feet (line 506 in FIG. 5) short-circuit echo responses. Line 608 shows the cross-correlation coefficients resulting from correlating the 0 feet, short-circuit echo response (line 502 in FIG. 5) and the 0 feet (line 402 in FIG. 4), 100 feet (not shown in FIG. 4), 200 feet (not shown in FIG. 4), 300 feet (not shown in FIG. 4), 400 feet (not shown in FIG. 4), 500 feet (line 404 in FIG. 4), 600 feet (not shown in FIG. 4), 700 feet (not shown in FIG. 4), 800 feet (not shown in FIG. 4), 900 feet (not shown in FIG. 4), and 1000 feet (line 406 in FIG. 4) open-circuit echo responses.

Based on FIG. 6, a threshold correlation value of around 0.9 can be used to determine if a first set of echo canceller coefficients is highly correlated with echo canceller coefficients associated with line 402 from FIG. 4 (that is, echo canceller coefficients associated with an open-circuit fault located 0 feet from a hybrid circuit 318). Also, a threshold correlation value of around 0.9 can be used to determine if a first set of echo canceller coefficients is highly correlated with echo canceller coefficients associated with line 502 from FIG. 5 (that is, echo canceller coefficients associated with an short-circuit fault located 0 feet from a hybrid circuit 318).

In one implementation of this embodiment, the programmable processor 324 is programmed in a suitable manner to carry out the processing of method 200. The programmable processor 324 is programmed by storing appropriate program instructions in memory 326. The program instructions are retrieved from memory 326 and executed on programmable processor 324. The program instructions are operable to cause the programmable processor 324 to carry out the processing of method 200. In other implementations, a computer or other device is coupled to the line card 300 (for example, via the craft interface 332 or via an embedded operations channel). The computer or other device then performs all or a portion of the processing of method 200.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method of analyzing an analyzed fault associated with an analyzed communication medium, comprising:
    correlating a first set of information indicative of echo associated with the analyzed communication medium with a second set of information indicative of echo;
    characterizing the analyzed fault based on the correlation between the first set of information and the second set of information; and
    wherein the second set of information comprises information indicative of echo associated with a reference fault.

2. The method of claim 1, wherein the analyzed communication medium is a twisted-pair telephone line.

3. The method of claim 2, wherein the twisted-pair telephone line is coupled to an HDSLx line interface unit.

4. The method of claim 1, wherein the analyzed fault includes a short circuit in the analyzed communication medium.

5. The method of claim 1, wherein the analyzed fault includes an open circuit in the analyzed communication medium.

6. The method of claim 1, further comprising receiving the first set of information.

7. The method of claim 1, wherein the first set of information includes a first set of echo canceller coefficients generated by an echo canceller.

8. The method of claim 7, wherein the first set of echo canceller coefficients are received by a controller from the echo canceller.

9. The method of claim 7, wherein the second set of information includes a second set of echo canceller coefficients.

10. The method of claim 9, wherein the second set of echo canceller coefficients is associated with a second fault.

11. The method of claim 10, wherein correlating the first set of information with the second set of information includes correlating the first set of echo canceller coefficients with the second set of echo canceller coefficients to create a correlation coefficient.

12. The method of claim 11, wherein correlating the first set of information with the second set of information includes performing a normalized covariance correlation to obtain the correlation coefficient between the first set of echo canceller coefficients and the second set of echo canceller coefficients.

13. The method of claim 11, wherein characterizing the fault based on the correlation between the first set of information and the second set of information includes:
   comparing the correlation coefficient to a threshold coefficient value; and
   when the correlation coefficient is greater than the threshold coefficient value, determining that the analyzed fault has an attribute associated with the second set of echo canceller coefficients.

14. The method of claim 13, wherein the attribute associated with the second set of echo canceller coefficients is a type of the second fault.

15. The method of claim 13, wherein the attribute associated with the second set of echo canceller coefficients is a location of the second fault.

16. The method of claim 9, wherein the reference fault is in a second communication medium similar to the analyzed communication medium.

17. The method of claim 16, farther comprising:
   prior to normal operation, operating the echo canceller while coupled to the second communication medium; and
   wherein the second set of echo canceller coefficients includes resultant echo canceller coefficients resulting from operating the echo canceller with the second fault in the second communication medium.

18. The method of claim 17, further comprising:
   saving the second set of echo canceller coefficients; and
   retrieving the saved second set of echo canceller coefficients.

19. The method of claim 9, further comprising retrieving the second set of echo canceller coefficients from a memory.

20. The method of claim 1, further comprising receiving the second set of information.

21. A telecommunication device, comprising:
   an interface adapted to couple the telecommunication device to an analyzed communication medium; and
   wherein the telecommunication device is adapted to:
      correlate a first set of information indicative of echo associated with the analyzed communication medium with a second set of information indicative of echo;
      characterize an analyzed fault associated with the analyzed communication medium based on the correlation between the first set of information and the second set of information; and
   wherein the second set of information comprises information indicative of echo associated with a reference fault.

22. The telecommunication device of claim 21, wherein the analyzed communication medium is a twisted-pair telephone line.

23. The telecommunication device of claim 22, wherein the telecommunication device is a line interface unit.

24. The telecommunication device of claim 21, wherein the analyzed fault includes a short circuit in the analyzed communication medium.

25. The telecommunication device of claim 21, wherein the analyzed fault includes an open circuit in the analyzed communication medium.

26. The telecommunication device of claim 21, further comprising an echo canceller, coupled to the interface, that is adapted to reduce echo.

27. The telecommunication device of claim 26, wherein the first set of information includes a first set of echo canceller coefficients generated by the echo canceller.

28. The telecommunication device of claim 27, wherein the second set of information includes a second set of echo canceller coefficients.

29. The telecommunication device of claim 28, wherein the second set of echo canceller coefficients is associated with a reference fault.

30. The telecommunication device of claim 29, wherein the reference fault is in a second communication medium similar to the analyzed communication medium.

31. The telecommunication device of claim 29, wherein the telecommunication device is adapted to correlate the first set of echo canceller coefficients with the second set of echo canceller coefficients to create a correlation coefficient.

32. The telecommunication device of claim 31, wherein the telecommunication device is adapted to perform a normalized covariance correlation to obtain the correlation coefficient between the first set of echo canceller coefficients and the second set of echo canceller coefficients.

33. The telecommunication device of claim 31, wherein the telecommunication device is adapted to compare the correlation coefficient to a threshold coefficient value, and if the correlation coefficient is greater than the threshold coefficient value, determine that the analyzed fault has an attribute associated with the second set of echo canceller coefficients.

34. The telecommunication device of claim 33, wherein the attribute associated with the second set of echo canceller coefficients is a type of the second fault.

35. The telecommunication device of claim 33, wherein the attribute associated with the second set of echo canceller coefficients is a location of the second fault.

36. The telecommunication device of claim 26, further comprising:
   a programmable processor coupled to the echo canceller; and
   a memory coupled to the programmable processor, wherein program instructions are stored in the memory, the program instructions operable to cause the programmable processor to:
      correlate the first set of information with the second set of information; and
      characterize the analyzed fault based on the correlation between the first set of information and the second set of information.

37. The telecommunication device of claim 26, wherein the interface includes a hybrid circuit, coupled to the echo canceller, adapted to couple the telecommunication device to the telephone line.

38. A method of analyzing an analyzed fault associated with an analyzed twisted-pair telephone line, comprising:
   receiving an echo canceller profile, wherein the echo canceller profile includes at least one set of profile echo canceller coefficients;
   correlating a set of first echo canceller coefficients from an echo canceller with at least one of the sets of profile echo canceller coefficients included in the echo canceller profile;

determining if there is a first correlation between the set of first echo canceller coefficients and at least one of the sets of profile echo coefficients included in the echo canceller profile; and when there is the first correlation between the set of first echo canceller coefficients and at least one of the sets of profile echo coefficients included in the echo canceller profile, determining that the analyzed fault has an attribute associated with the at least one set of profile echo coefficients included in the echo canceller profile with which the set of first echo canceller coefficients has the first correlation.

39. The method of claim 38, wherein the first correlation is a high correlation.

40. The method of claim 38, further comprising generating the echo canceller profile.

41. The method of claim 40, wherein the echo canceller profile is generated during a manufacturing process.

42. The method of claim 40, wherein generating the echo canceller profile includes:

operating the echo canceller with a second fault in a second twisted-pair telephone line coupled to the echo canceller; and including in the echo canceller profile a first set of profile echo canceller coefficients generated by operating the echo canceller with the second fault in the second twisted-pair telephone line.

43. The method of claim 40, wherein the echo canceller profile is generated during an installation process.

44. The method of claim 40, wherein generating the echo canceller profile includes updating the echo canceller profile during normal operation.

45. The method of claim 38, further comprising receiving the set of the first echo canceller coefficients from an echo canceller.

46. The method of claim 45, wherein the set of first echo canceller coefficients is received by a programmable processor from the echo canceller.

47. The method of claim 38, wherein the set of first echo canceller coefficients from the echo canceller includes fault-test echo canceller coefficients generated by the echo canceller during a fault test mode.

48. The method of claim 38, wherein the set of first echo canceller coefficients from the echo canceller includes normal-operation echo canceller coefficients generated by the echo canceller during a normal operating mode.

49. The method of claim 38, wherein the attribute associated with the set of profile echo canceller coefficients is a type of a known fault associated with the set of profile echo canceller coefficients.

50. The method of claim 38, wherein the attribute associated with the set of profile echo canceller coefficients is a location of a known fault associated with the set of profile echo canceller coefficients.

51. A line interface unit, comprising:

a first interface adapted to couple the line interface unit to a first communication link;

a second interface, coupled to the first interface, adapted to couple the line interface unit to a second communication link;

an echo canceller coupled to the first communication link; and a controller, coupled to the echo canceller, adapted to:

correlate a set of first echo canceller coefficients with a second set of echo canceller coefficients to create a correlation between the first set and the second set;

characterize an analyzed fault associated with the first communication link based on the correlation between the first set and the second set; and wherein the second set of information comprises information indicative of echo associated with a reference fault.

52. The line interface unit of claim 51, wherein the first communication link includes at least one twisted-pair telephone line.

53. The line interface unit of claim 52, wherein the first interface is adapted to couple the line interface unit to the at least one twisted-pair telephone line.

54. The line interface unit of claim 53, wherein the first communication link is an HDSL2 link.

55. The line interface unit of claim 54, wherein the first interface includes an HDSL2 framer.

56. The line interface unit of claim 52, wherein the first interface includes a hybrid circuit, coupled to the echo canceller, that is adapted to couple the line interface unit to the at least one twisted-pair telephone line.

57. The line interface unit of claim 51, wherein the controller includes:

a programmable processor coupled to the echo canceller;

a memory coupled to the programmable processor, wherein program instructions are stored in the memory, the program instructions operable to cause the programmable processor to:

correlate the set of first echo canceller coefficients with the second set of echo canceller coefficients to create the correlation between the first set and the second set; and characterize the analyzed fault based on the correlation between the first set and the second set.

58. A method of analyzing an analyzed fault associated with an analyzed communication medium, comprising:

correlating a first set of information indicative of echo associated with the analyzed communication medium with a second set of information indicative of echo; and characterizing the analyzed fault based on the correlation between the first set of information and the second set of information;

wherein the first set of information includes a first set of echo canceller coefficients generated by an echo canceller;

wherein the second set of information includes a second set of echo canceller coefficients associated with a second fault; and wherein correlating the first set of information with the second set of information includes correlating the first set of echo canceller coefficients with the second set of echo canceller coefficients to create a correlation coefficient.

59. The method of claim 58, wherein correlating the first set of information with the second set of information includes performing a normalized covariance correlation to obtain the correlation coefficient between the first set of echo canceller coefficients and the second set of echo canceller coefficients.

60. The method of claim 58, wherein characterizing the fault based on the correlation between the first set of information and the second set of information includes:

comparing the correlation coefficient to a threshold coefficient value; and when the correlation coefficient is greater than the threshold coefficient value, determining that the analyzed fault has an attribute associated with the second set of echo canceller coefficients.

61. The method of claim 60, wherein the attribute associated with the second set of echo canceller coefficients is a type of the second fault.

62. The method of claim 60, wherein the attribute associated with the second set of echo canceller coefficients is a location of the second fault.

63. A telecommunication device, comprising:

an interface adapted to couple the telecommunication device to an analyzed communication medium;

wherein the telecommunication device is adapted to:

correlate a first set of information indicative of echo associated with the analyzed communication medium with a second set of information indicative of echo; and characterize an analyzed fault associated with the analyzed communication medium based on the correlation between the first set of information and the second set of information;

further comprising an echo canceller, coupled to the interface, that is adapted to reduce echo;

wherein the first set of information includes a first set of echo canceller coefficients generated by the echo canceller;

wherein the second set of information includes a second set of echo canceller coefficients associated with a second fault; and wherein the telecommunication device is adapted to correlate the first set of echo canceller coefficients with the second set of echo canceller coefficients to create a correlation coefficient.

64. The telecommunication device of claim 63, wherein the telecommunication device is adapted to perform a normalized covariance correlation to obtain the correlation coefficient between the first set of echo canceller coefficients and the second set of echo canceller coefficients.

65. The telecommunication device of claim 63, wherein the telecommunication device is adapted to compare the correlation coefficient to a threshold coefficient value, and if the correlation coefficient is greater than the threshold coefficient value, determine that the analyzed fault has an attribute associated with the second set of echo canceller coefficients.

66. The telecommunication device of claim 63, wherein the attribute associated with the second set of echo canceller coefficients is a type of the second fault.

67. The telecommunication device of claim 63, wherein the attribute associated with the second set of echo canceller coefficients is a location of the second fault.

* * * * *